United States Patent Office 3,001,999
Patented Sept. 26, 1961

3,001,999
PRODUCTS OF PHENOL DERIVATIVES WITH FORMALDEHYDE AND AMINES
Charles F. Geschickter, Kensington, Md., and Jacob R. Meadow, Lexington, Ky., assignors to The Geschickter Fund for Medical Research Inc., Washington, D.C., a corporation of New York
No Drawing. Filed Dec. 1, 1955, Ser. No. 550,485
1 Claim. (Cl. 260—247.7)

This invention relates to therapeutic compounds which are antihistaminic and anticholine and are useful in the treatment of asthma.

It has been found that certain poly-substituted phenol derivatives when reacted with formaldehyde and di-alkylamines by means of the Mannich reaction have special therapeutic properties which are particularly useful in the treatment of asthma. They possess the property of being both antihistaminic as well as bronchial dilators.

It is accordingly an object of the present invention to provide novel nitrogen derivatives of certain substituted phenolic compounds.

The invention covers phenols in which one hydrogen atom has been replaced with a Manniched amine group, and from two to four hydrogen atoms have been replaced with a substituent selected from the group consisting of a halogen and methyl, ethyl, propyl and isopropyl alkyls, as represented, for example, by the following type formulae:

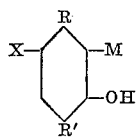

in which R and R' represent alkyl groups, x represents a halogen group, and M represents a Manniched amine group;

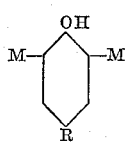

in which R represents an alkyl group such as isopropyl or tert-butyl, and M represents a Manniched amine group;

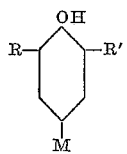

in which R and R' represent similar or different alkyl groups, and M represents a Manniched amine group.

Following are examples of the novel therapeutically effective nitrogen derivatives of substituted phenolic compounds encompassed by the present invention.

EXAMPLE I

*Preparation of 2-piperidinomethyl-6-chlorothymol*

A solution was made by dissolving 6-chlorothymol (7.38 g., 0.04 mole) in 16 ml. of absolute alcohol in a small round bottom flask, and piperidine (7.0 g., 0.08 mole) was slowly added. The mixture was cooled in an ice bath and a 37% aqueous formaldehyde solution (5.4 g., 0.06 mole) was added dropwise over a 15-minute period with constant shaking. The resulting mixture was allowed to stand at room temperature for about an hour; it was then fitted to a return condenser and refluxed on a steam bath for four hours. The excess solvent and other volatile components were removed by distillation under diminished pressure leaving a viscous, oily residue. About 15 ml. of 85% methanol was mixed with the warm residue which was then chilled; white crystals formed immediately. These were filtered by suction and washed quickly with 10–15 ml. of cold 80% methanol. A 96% yield of crude product weighing approximately 11 g. was obtained; the melting point was 84–5° C. The latter was raised to 85–6° on recrystallization from 35 ml. of absolute methanol, producing long, needle-like crystals. The free base forms a salt with dimethane sulfonamide (and other acids) which shows a limited solubility in water, i.e., 8–10 mg. per ml. as a maximum at 20° C. The acute toxicity value of the salted solution is: $LD_{50}=1000$ mg./kg.

Other substituted amino-methyl derivatives of 6-chlorothymol have been prepared. These include:

(1) 2-morpholinomethyl-6-chlorothymol, M.P. 90–1° C.;
(2) 2-pyrrolidinomethyl-6-chlorothymol, M.P. 59–60° C.;
(3) 2 - (N - methyl - piperazinomethyl)-6-chlorothymol, M.P. 87–87.5° C.;
(4) 2-(diethylaminomethyl)-6-chlorothymol, M.P. 26–7° C.;
(5) 2-dimethylaminomethyl)-6-chlorothymol, M.P. 54–5° C.;

These compounds were prepared by methods similar to that described above for 2-piperidinomethyl-6-chlorothymol.

EXAMPLE II

*Preparation of 2,6-bis(dimethylaminomethyl)-thymol*

Pure thymol (6.0 g., .04 mole), M.P. 50–51° C., was dissolved in 20 ml. of absolute ethyl alcohol, using a 100 ml. small round bottom flask, and 24 g. (0.13 mole) of a 25% aqueous solution of dimethylamine was slowly added. After cooling the contents of the flask in an ice bath, a 37% aqueous solution of formaldehyde (9.0 g., 0.10 mole) was then added slowly over a twenty-minute period, and the mixture was allowed to stand at room temperature for about one hour. The flask was then attached to a reflux condenser and its contents refluxed gently on a water bath for at least two and one-half hours. The excess solvent was then removed by evaporation, preferably under reduced pressure, leaving an amber colored gummy residue which crystallized slowly on cooling. The product, weighing 6.1 g., was purified by extracting with dilute HCl and precipitating the free amine base with a slight excess of dilute ammonia. After washing with water and drying, a white crystalline product, M.P. 60.5–61.0° C., was obtained. It was readily soluble in dilute mineral acids and dimethanesulfonamide.

Other examples of Mannich derivatives of thymol which are conveniently prepared by this procedure include the following: 2,6 - bis(piperidinomethyl) - thymol, M.P. 83.5–85.0° C., 2,6 - bis (morpholinomethyl) - thymol, M.P. 112–3° C., and 2,6-bis(pyrrolidinomethyl)-thymol, M.P. 95.5–96.0° C. All are soluble in dilute acids.

EXAMPLE III

*Preparation of 2,6-bis(morpholinomethyl)-4-tert-butyl-phenol*

This derivative was made by dissolving 10 g. (.067 mole) of p-tert-butylphenol and 14.4 g. (0.165 mole) of morpholine in 15 ml. of absolute alcohol, cooled, and 13.5 g. (.165 mole) of 37% formaldehyde slowly added. The mixture was kept in an ice bath during the dropwise addition of the HCHO. After standing for one hour at room temperature the solution was refluxed on a water bath for four hours and allowed to cool. The excess solvent was removed by evaporation under diminished pressure, and 10 ml. of fresh absolute alcohol added. Crystals began to appear immediately on cooling. These were filtered and washed with 10–15 ml. of ethyl alcohol. Recrystallization from 40 ml. of hot 95% ethyl alcohol produced 13.7 g. of white, needle-like crystals, M.P. 128–130° C.

In a similar manner, "mono-Mannich" derivatives of p-tert-butylphenol can be prepared. For example, using 1:1 molar ratios of reactants the 2-piperidinomethyl-4-tert-butylphenol, M.P. 48.5–49.5° C. and the 2-morpholinomethyl-4-tert-butylphenol, M.P. 80–82° C., were prepared. All of these derivatives were soluble in dilute mineral acids.

In a similar manner the following compounds were also prepared: The morpholine, piperidine, pyrrolidine, N-methyl piperazine and diethylamine derivatives of 2-4-5-trichlorophenol; the morpholine, piperidine, pyrrolidine and methyl piperazine derivatives of 2-6-diisoprophyphenol; and the piperidine, dimorpholine and methyl piperazine derivatives of 4-chloro, 3-5-dimethyl phenol.

From the foregoing description of exemplary compounds it will be apparent that novel and improved therapeutic compounds fulfilling the objects of the invention have been disclosed.

The invention may be employed in other specific compounds, however, without departing from the spirit or essential characteristics thereof. The compounds disclosed herein are therefore to be considered in all respects as illustrative and not restrictive, the scope of the invention being indicated by the appended claim rather than by the foregoing description, and all compositions which come within the meaning and range of equivalency of the claim are therefore intended to be embraced therein.

What is claimed and desired to be secured by United States Letters Patent is:

As a novel composition of matter, a compound selected from the group consisting of compounds having the formula:

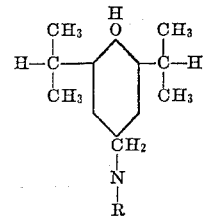

where N-R is selected from the group consisting of the morpholino, piperidino, pyrrolidino and N'-methyl piperazino radicals.

References Cited in the file of this patent

UNITED STATES PATENTS

| | | |
|---|---|---|
| 2,363,134 | McCleary | Apr. 26, 1941 |
| 2,636,019 | Butler et al. | Apr. 19, 1953 |

OTHER REFERENCES

Burckhalter et al.: J. Am. Chem. Soc. 68, 1894–1901 (1946).
Burke et al.: J. Am. Chem. Soc. 74, 602–5 (1952).
Chem. Abs. Index, vol. 48, col. 1400s (1954).
Adams et al.: Organic Reactions, vol. 1, pp. 304, 311 and 314.
J. Am. Chem. Soc., 61:765–766.

UNITED STATES PATENT OFFICE
CERTIFICATION OF CORRECTION

Patent No. 3,001,909                            September 26, 1961

Charles F. Geschickter et al.

It is hereby certified that error appears in the above numbered patent requiring correction and that the said Letters Patent should read as corrected below.

Column 1, lines 30 to 35, the formula should appear as shown below instead of as in the patent:

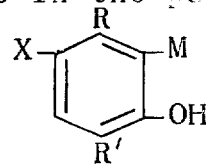

same column 1, lines 40 to 44, the formula should appear as shown below instead of as in the patent:

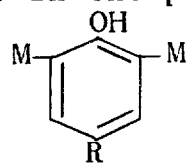

same column 1, lines 49 to 54, the formula should appear as shown below instead of as in the patent:

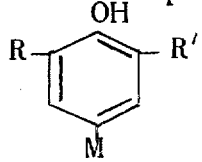

column 2, line 26, for "2-dimethylaminomethyl)-" read -- 2-(dimethylaminomethyl)- --; column 3, line 17, for "2-4-5-" read -- 2,4,5- --; line 19, for "2-6-diisoprophy-" read -- 2,6-diisopropyl- --; same column 3, line 21, for "3-5-dimethyl" read 3,5-dimethyl --; column 4, lines 7 to 15, the formula should appear as shown below instead of as in the patent:

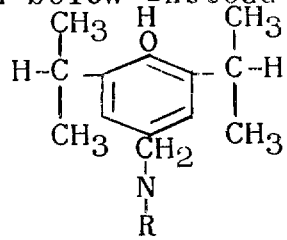

Signed and sealed this 1st day of May 1962.

(SEAL)
Attest:

ERNEST W. SWIDER                               DAVID L. LADD
Attesting Officer                                     Commissioner of Patents